Dec. 16, 1969     D. E. BEARINT     3,483,710
CASCADE ABSORPTION REFRIGERATION SYSTEM
Filed June 13, 1968     2 Sheets-Sheet 1

INVENTOR.
DAVID E. BEARINT
BY
MAHONEY, MILLER & RAMBO
BY Wm. V. Miller
ATTORNEYS

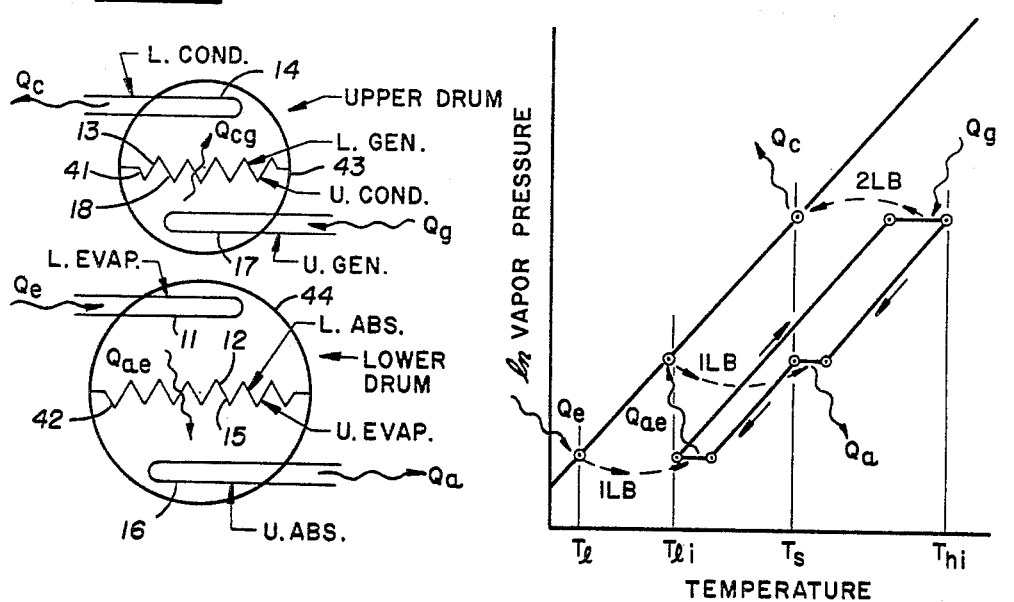
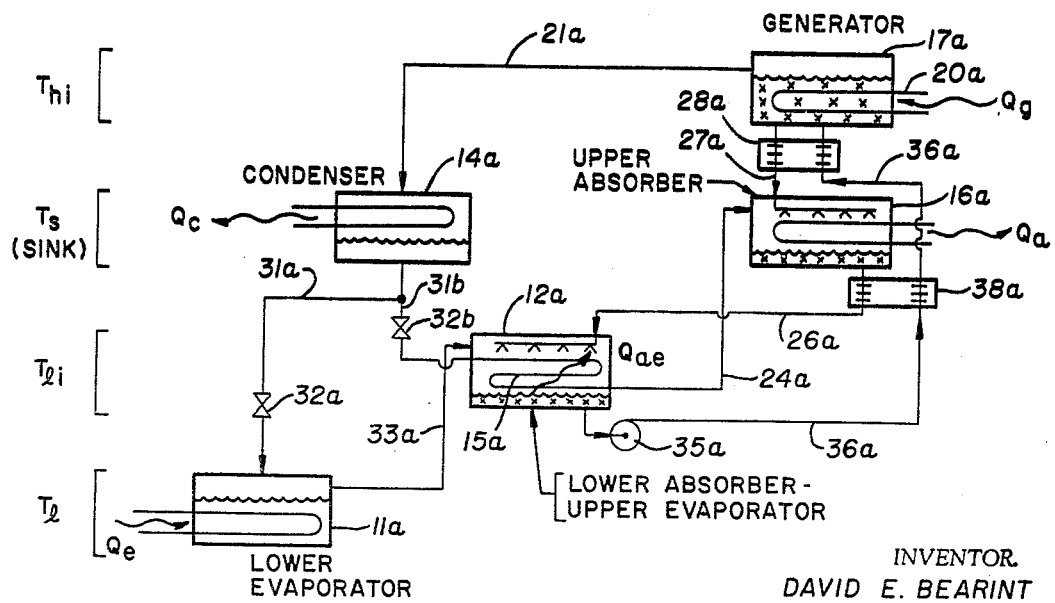

United States Patent Office 3,483,710
Patented Dec. 16, 1969

3,483,710
CASCADE ABSORPTION REFRIGERATION
SYSTEM
David E. Bearint, Columbus, Ohio, assignor to Crane
Company, Chicago, Ill., a corporation of Illinois
Filed June 13, 1968, Ser. No. 736,765
Int. Cl. F25b 7/00, 15/06
U.S. Cl. 62—79                                    14 Claims

ABSTRACT OF THE DISCLOSURE

A refrigerator system of the absorption type in which certain definite advantages are obtained by arranging the components thereof to provide a thermodynamic cascade cycle. The components of the system are combined in such a manner that certain upper-cycle and lower-cycle components are in a heat exchange relationship. The upper-cycle accepts motivating heat from a high-temperature external heat source and the lower-cycle accepts the cooling load from a low-temperature cooling source. Although variations of thermodynamic cascade cycles are provided according to this invention, in each system a lower-cycle absorber and an upper-cycle evaporator are in heat exchange relationship. The result is that the upper-cycle evaporator cools the lower-cycle absorber. The motivating heat is accepted at an upper-cycle generator which operates at the highest temperature level of the system while the cooling load is accepted at a lower-cycle evaporator which operates at the lowest temperature level of the system. The components that reject heat to the available heat sink are an upper-cycle absorber and a lower-cycle condenser. The basic concept of this invention is to cascade two absorption cycles, with the upper-cycle serving to maintain the temperature of the lower-cycle absorber somewhere between the available sink temperature and the lower temperature of the cooling load. By doing this it is possible to operate with reduced solution concentrations, providing normal water-cooled sink temperatures are maintained, or conversely, normal solution concentrations can be maintained at the higher sink temperatures encountered with direct air-cooling. A system using this cascade cycle can be air-cooled and it can be used for both cooling and heating.

BACKGROUND OF THE INVENTION

This invention is particularly concerned with absorption refrigeration systems which are heat-motivated and use working pairs of refrigerant and absorbent as the work coupling joining the thermal engine and refrigerator of the system. At the present time, only two working pairs are being used commercially in absorption refrigeration equipment: Lithium-bromide and water, and ammonia and water. In the lithium-bromide and water pair, water is the refrigerant and the lithium-bromide salt is the absorbent. In the ammonia and water pair, water reverses its role and becomes the absorbent for ammonia, which is now the refrigerant. The ammonia and water pair is used today for residential and small commercial air-conditioning applications. The prime advantage of this pair is derived from the fact that there are no solubility limits with ammonia and water and for this reason, ammonia-water units are now available in the air-coolable type. Another advantage is that the refrigerant and absorbing solution have low enough freezing points that special precautions are not required during the winter months. However, two serious disadvantages of the ammonia-water pair center around the hazards associated with using ammonia as a refrigerant and the significant volatility of the water absorbent. The hazard problem concerns the toxicity and explosive potential of ammonia. The volatility of the water absorbent is an undesirable factor since it complicates the mechanical design. Another significant mechanical complication required in an ammonia-water system is a means to transfer solution rich in refrigerant from the absorber to the generator due to the substantial difference in pressure between the high pressure and low pressure sides of the cycle. This results in a serious problem in designing a satisfactory zero leakage solution pump so that most ammonia-water units use a trap which is reliable but due to its intermittent operation, lowers the efficiency of the unit making for increased fuel costs and larger sized components than are possible with a continuously pumped unit.

The working pair lithium-bromide and water has several distinct advantages over the working pair ammonia and water. For one, there are no toxicity, explosion, or high-pressure hazards. Equipment, using this pair can, therefore, be installed anywhere in buildings without fear of endangering occupants. Another important advantage results from the negligible volatility of the lithium-bromide absorbent. This means that only refrigerant vapor is desorbed in the generator and additional analyzers and rectifiers are not required as they are with the ammonia and water pair. This, in turn, allows for a more smiplified mechanical construction. Furthermore, relatively low-pressure differences exist between the high and low-pressure sides of a lithium-bromide and water unit. Solution pumping can, therefore, be less of a problem. In fact, some residential type units do not have any mechanical solution pumps at all and solution circulation is achieved solely by percolating the solution to a high level in the generator and letting it return, via the absorber, by way of gravity.

The disadvantages of the working pair lithium-bromide and water as used today in absorption refrigeration systems are primarily two. First, a unit using this pair cannot be reliably air-cooled when operating, as used presently, in a simple absorption cycle. This is due mainly to the crystallization problem encountered when an attemp is made to operate at high-solution temperatures in the absorber while maintaining the same evaporator conditions. This ties lithium-bromide units to reliable sources of cooling water, such as a cooling tower, as a heat-sink. Penetration into the large volume residential market, therefore, becomes more difficult. The other prime disadvantage of this couple is the corrosiveness of lithium-bromide and water solution to the usual construction materials when in the presence of oxygen. Due to the low absolute pressures existing in these units, some amount of air will inevitably leak into the system. The result usually takes the form of excessive localized corrosions if proper precautions are not taken.

From the above comparison of the working pairs, water and ammonia, and lithium-bromide and water, it will be apparent that the latter offers several desirable advantages as the working fluid pair in absorption refrigeration equipment but as used today, this pair also has certain disadvantages mainly because units using it cannot be reliably air-cooled due to solubility limits. This has meant that heat-motivated units using this couple could not be considered where the only practical or available heat-sink is ambient air. Today, more and more applications are finding that the only practical heat-sink is the ambient air, due to water shortages and the destructive effects of absorbed air pollutants on cooling towers. The cascade absorption thermodynamic cycle which is this invention overcomes certain major disadvantages of the use of the working fluid pair, lithium-bromide and water, and makes it possible to use this couple effectively in air-cooled systems. However, the cascade cycle of this invention is not limited to use of this specific working couple, as will be brought out later, inasmuch as the cascade cycle of this invention results in important advantages even when other working fluid couples are used therewith.

PRIOR ART

It has been proposed in the prior art to use a two-stage arrangement in an absorption refrigeration system employing ammonia as the refrigerant and water as the absorber. This prior art arrangement did employ a two-stage refrigerant generator in which the refrigerant vapors from the one stage, which was heated directly, were used to heat the generator of the second stage by a heat exchange relationship. A weaker solution was employed in the second stage although these stages were interconnected. Since the lower temperature refrigerant vapors from the generator of the first stage were used to activate the generator of the second stage, theoretically, it was possible to reduce the internal corrosion rates in the second stage. However, there was a loss in efficiency in this prior art cascade system in that the weaker solution should receive heating at the highest temperature level to release the refrigerant vapors therefrom, which are more difficult to release, and employ them to heat the stronger solution from which the refrigerant vapors can be released more readily.

Another prior art absorption refrigeration system employed lithium salts and water as a working pair and was based mainly on the idea of a multi-effect generation and evaporation at two or more temperature levels. Regardless of whether or not the refrigerant operated in one or several stages, this prior art system was designed to provide at least two stages of evaporators and at least two stages of absorbers so that cooling or heat absorption was furnished at two levels. However, this prior art system was so designed that the two stages were interconnected with the cascade portion of the system being merely common to the upper evaporator and a vapor was directed into the upper stage of the system and a liquid into the lower stage of the system. Also, in this prior art system, the absorbent solution was transferred from the lower absorber to the upper absorber. In addition, in this system, the refrigerant evolved in the primary heating zone provided cooling for both the lower absorber and lower evaporator. Furthermore, in this system, the weakened solution from the primary heating zone was routed through the lower generator, lower absorber, upper absorber and back to the primary heating zone.

BRIEF DESCRIPTION OF DRAWINGS

In the accompanying drawings, there are illustrated examples of cascade absorption refrigeration systems embodying the present invention and in these drawings:

FIGURE 2 is a schematic view illustrating corrugated heat exchangers thermally joining a double-drum water-cooled cascade unit which may be used in the system of FIGURE 1.

FIGURE 3 is a view similar to FIGURE 1 but relating to a modified cascade cycle of this invention which may be termed a low-temperature cascade cycle.

FIGURE 3a is a P-T-x plot of the cascade cycle illustrated in FIGURE 3.

BASIC CASCADE SYSTEM

The basic cascade cycle of this invention is provided by a system which consists essentially of two separate absorption loops with heat exchange between certain components of each. More specifically, the absorber of the lower loop and the evaporator of the upper loop exchange heat and, therefore, the upper-loop evaporator cools the lower-loop absorber. A similar heat exchange relationship is provided between the generator of the lower loop and the condenser of the upper loop and, therefore, the heat rejected by the upper condenser is used to motivate the lower loop. The direct heat to motivate the entire system is accepted at the upper loop generator while the cooling load is accepted by the lower-loop evaporator. The two components that reject heat to the available heat-sink are the absorber in the upper loop and the condenser in the lower loop. This cascade arrangement has a number of tempearture and pressure levels. By placing the two absorption cycles in the cascade arrangement according to this invention, for the same evaporator and sink temperatures usually present in simple absorption cycle systems, it can operate at reduced solution concentrations thereby lessening the problem of crystallization if lithium-bromide and water is used as the working fluid pair. Or with the same solution concentrations as in a simple absorption cycle, the system will be capable of operating at higher sink temperatures, thereby making air-cooling feasible.

The refrigeration system embodying the basic cascade cycle of this invention will permit use of various fluid working pairs due to the fact that the upper and lower loops are separate and independent. Reliable air-cooling will be possible with this cascade system when the working pair is lithium-bromide and water. Also, it will permit the use of lithium-chloride and water as the working pair if water-cooling is available. Other working fluid combinations are possible and the same or different pairs may be used in the separate loops.

With this cascade system, the upper loop has the job of maintaining the temperature of the lower loop absorber somewhere between the available sink temperature and the lower temperature, that is, the cooling load. By doing this it is possible to operate at the reduced solution concentrations, in a lithium-bromide-water system, providing normal water cooled sink temperatures are maintained. This also allows the use of lithium-chloride and water as the working fluid pair. Conversely, if sink temperatures are in excess of those encountered with cooling towers, such as with direct air cooling, this cascade system still permits the use of lithium-bromide and water as the working fluid pair. The cooling load is pumped from the lower temperature to sink temperature in essentially two steps in the cascade cycle of this invention as opposed to essentially one step in a conventional simple absorption cycle.

Figure 1:
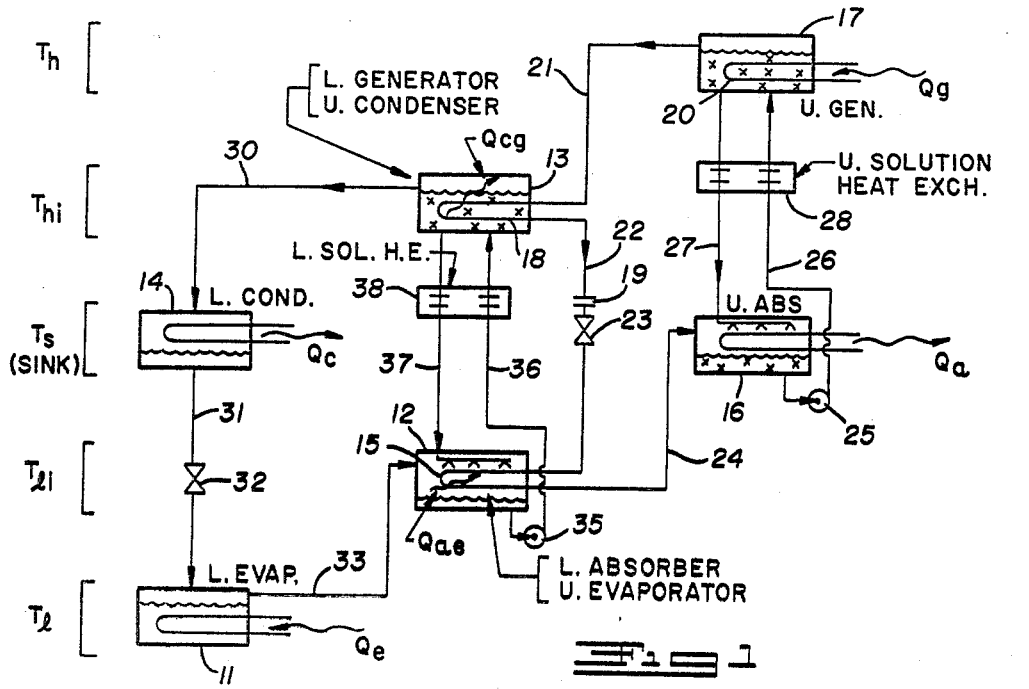
FIGURE 1 is a schematic piping diagram of the basic cascade system of this invention with the components thereof arranged vertically in the diagram according to their respective operating temperature levels.

With particular reference to FIGURE 1 of the drawings, a basic cascade system embodying the present invention is illustrated as consisting of a total of eight primary components, numbered 11 through 18. Components 11 to 14, inclusive, form the lower loop whereas components 15 through 18 form the upper loop. As previously indicated, this figure shows the various components arranged vertically at different levels according to operating temperatures, the five temperature levels being designated as indicated in the figure and the following table which specifies the components at the respective temperature levels.

TABLE I

| Operating Temp. | Lower loop Comp. 11–12 | Upper loop Comp. 15–18 |
|---|---|---|
| $T_h$ (highest) | | 17-upper generator. |
| $T_{hi}$ (higher intermediate) | 13-lower generator | 18-upper condenser. |
| $T_s$ (sink) | 14-lower condenser | 16-upper absorber. |
| $T_{li}$ (lower intermediate) | 12-lower absorber | 15-upper evaporator. |
| $T_l$ (lowest) | 11-lower evaporator | |

As can be seen from FIGURE 1, two components of each of the upper and lower loops are in heat-exchange relationship. The absorber 12 of the lower loop and the evaporator 15 of the upper loop exchange heat and the generator 13 of the lower loop and the condenser 18 of the upper loop similar exchange heat.

Assuming the upper and lower loops are provided with a suitable refrigerant and absorber solution, either the same or different in the respective loops, the heat to motivate the entire cascade system is supplied directly to the upper loop from a suitable external high-temperature heat source such as a gas burner, indicated at 20 in FIGURE 1, and this heat is accepted at the upper loop generator 17. The heat input is designated as the quantity $Q_g$ in this figure. The high temperature to which the upper generator 17 is subjected, which is the highest temperature level $T_h$, causes boiling off of refrigerant vapor from the liquid refrigerant and absorber solution therein, through the connecting line 21 to the upper condenser 18 which operates at the higher intermediate temperature $T_{hi}$. From the condenser 18, the liquid refrigerant condensed thereby passes through a connecting line 22, provided with a condensate subcooler 19 and an expansion valve 23, to the upper evaporator 15. The evaporator 15 operates at the lower intermediate temperature $T_{li}$ and absorbs heat from the lower absorber 12. From the evaporator 15, the refrigerant vapor passes through a connecting line 24 to the upper absorber 16. This absorber serves to take the vapor from the evaporator 15 into solution and this solution is withdrawn by a connected suitable pump 25 and is then pumped through a line 26 into the upper generator 17. This upper absorber 16 operates at sink temperature $T_s$ in rejecting heat of absorption to sink and this is designated as the quantity $Q_a$. The upper generator 17 is also connected by a liquid line 27 with the upper absorber 16 for supplying absorbing solution thereto. In addition, a heat exchanger 28 is arranged between the lines 26 and 27 for heat exchange between the upper loop solution in the respective lines.

As previously indicated, the upper loop condenser 18 is in heat-exchange relationship with the lower loop generator 13. The heat rejected by the upper condenser 18, indicated as the quantity $Q_{cg}$ in FIGURE 1, is used to motivate the lower cycle. It operates the lower generator 13 at the higher intermediate temperature $T_{hi}$. This heat boils out the refrigerant in the lower loop solution and the vapor passes through a line 30 into the lower condenser 14. This lower condenser 14 operates at sink temperature $T_s$ and rejects heat of condensation to sink, and this is designated as the quantity $Q_c$. From the condenser 14, the liquid refrigerant will pass through a line 31, provided with an expansion valve 32, to the lower loop evaporator 11 which receives the cooling load from chilled water, air to be cooled, process fluid, or other low-temperature heat source, which is designated as the quantity $Q_e$. This evaporator 11 operates at the lowest temperature level $T_l$. The pure liquid refrigerant in this evaporator is converted by the cooling load into a refrigerant vapor which passes through a line 33 into the lower absorber 12 which, as previously indicated, is in heat exchange relationship with the upper evaporator 15. The absorbing solution in the absorber 12 takes the vapor from the lower evaporator 11 into solution and rejects heat of absorption, indicated as the quantity $Q_{ae}$, to the upper evaporator 15. This lower absorber 12 operates at the lower intermediate temperature $T_{li}$. From this absorber, the absorbing solution is withdrawn by a connected suitable pump 35 and is then pumped through a line 36 into the lower generator 13. The lower generator 13 is also connected by a liquid line 37 with the lower absorber 12 for supplying absorbing solution thereto. In addition, a heat exchanger 38 is arranged between the lines 36 and 37 for heat exchange between the lower loop solution in the respective lines.

Figure 1A:
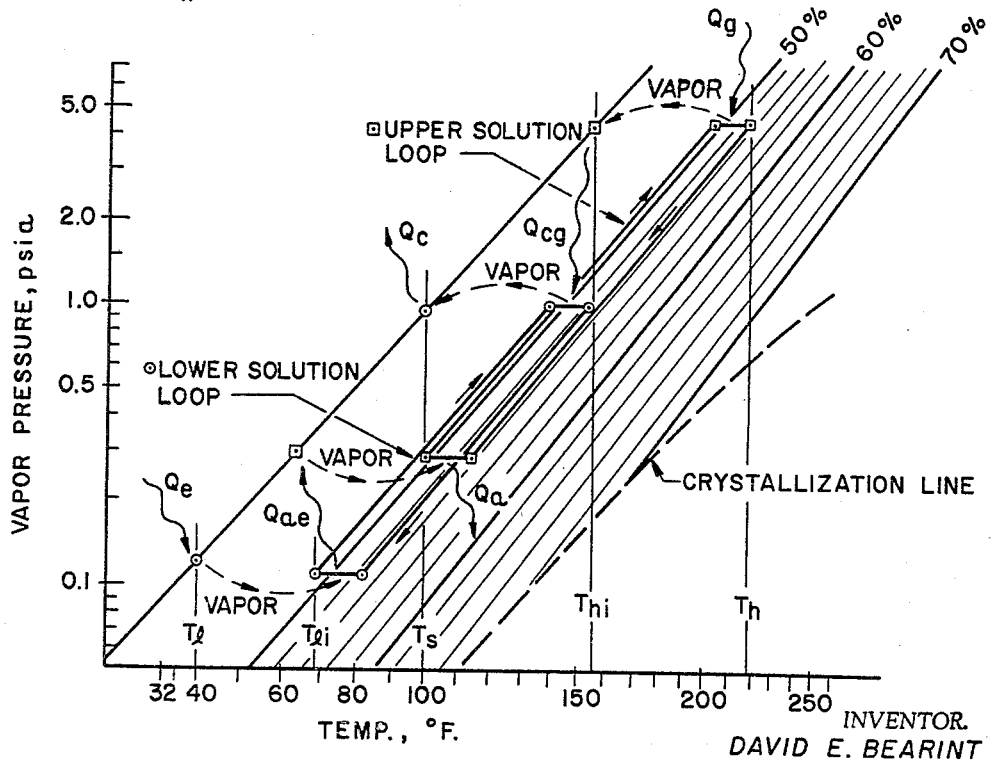
FIGURE 1a is a P-T-x plot illustrating the advantages of the absic cascade system of FIGURE 1, especially as to placing two absorption cycles in a cascade arrangement, showing the possibility of using a weaker solution concentration in a water-cooled system.

As previously indicated, the same or different refrigerant-absorber solutions may be used in the respective loops. Assuming that the same solution is used in both and that it is lithium-bromide and water, the diagram of FIGURE 1a demonstrates the advantages that result from providing the cascade system described above whereby two thermodynamic absorption cycles are provided in a cascade arrangement. This diagram is a schematic vapor pressure-temperature-concentration diagram and shows that for the same 40° F. evaporator and 100° F. sink temperature conditions that are frequently assumed for the simple absorption cycle, the cascade cycle provided by the system of this invention has the advantage that it can operate at reduced solution concentrations. The usual simple absorption cycle operates between solution concentrations of 58 and 62 percent whereas the cascade cycle, as indicated in this diagram, reduces this to 49 and 53 percent. In other words, the cascade cycle operates farther to the left of the crystallization line for the same evaporator and sink conditions. This, in turn, means that when the cascade cycle is moved back toward the right and the crystallization line, it will be capable of operating at higher sink temperatures than are possible in a simple absorption cycle, which will make air-cooling feasible in this cascade system.

Table II which follows, indicates internal working-fluid conditions at various locations in the cascade system. These include temperatures, pressures, solution concentrations, enthalpies, and relative mass flows at the various individual components. Heat flows at individual components are also listed on the basis of B.t.u. per hour for 15-ton unit. This cascade cycle was assumed to receive 110° F. sink water which takes a 15° F. rise in temperature through the upper absorber and lower condensor. It is quite possible that 110° F. return water temperatures could be supplied by a heat exchanger cooled with 95° F. inlet air. The solution concentration change across the absorbers was set at 6 percent. Maximum relative solution pumping was found to be 11.95 in the upper loop, and solution concentrations varied from 53 to 59 percent. Maximum solution temperature in the upper generator was found to be about 318° F. Other assumptions were: Lower evaporator operating internally at 43° F., an 8° F. minimum approach temperature for heat transfer at the major components, and a 15° F. minimum approach temperature at the cold end of the two solution heat exchangers. Also, it was assumed that the liquid refrigerant in the upper loop was sub-cooled to the 133° F. saturation temperature prevailing in the lower condenser which rejects to the available sink. The heat transfer rate totals of the table show that a 15-ton cascade cycle transfers 1,671,500 B.t.u. per hour.

The internal COP of a cascade cycle unit operating at the above conditions would be about 0.66. Applying an efficiency of 80% for a direct-fired upper generator heat exchanger gives an expected COP of about 0.53 based on the heating value of the fuel. This is comparable to the COP developed by presently available absorption units that are not air-coolable. Present results indicate the cascade cycle would see maximum solution temperatures in the range of 280° F. to 320° F. when supplied with 110° F. sink water.

TABLE II.—INTERNAL WORKING FLUID CONDITIONS, RELATIVE MASS FLOWS, AND HEAT TRANSFERRED

| Component | | Temperature, F. | | Nominal pressure, p.s.i.a. | Solution concentration, percent LiBr | Enthalpy, B.t.u./lb. | | Relative mass flow [1] | | B.t.u./hr. transferred for 15 ton unit |
|---|---|---|---|---|---|---|---|---|---|---|
| No. | Name | Refrig. | Solution | | | Refrig. | Solution | Refrig. | Solution | |
| 11 | Lower evaporator. | 43 | | 0.136 | 0 (pure water). | 101 in, 1,080.6 out. | | 1.0 | | 180,000 |
| 12 | Lower absorber. | 43 | 101 in, 86 out. | 0.136 | 59 in, 53 out. | 1,080.6 in. | −70.5 in, −76.0 out. | 1.0 | 8.85 in, 9.85 out. | 221,500 |
| 15 | Upper evaporator. | 78 | | 0.475 | 0 | 101 in, 1,095.8 out. | | 1.21 | | |
| 16 | Upper absorber. | 78 | 143 in, 128 out. | 0.475 | 59 in, 53 out. | 1,095.8 in. | −51.5 in, −55.0 out. | 1.21 | 10.74 in, 11.95 out. | 262,000 |
| 14 | Lower condenser. | 133 | | 2.4 | 0 | 1,156 in, 101 out. | | 1.0 | | 194,000 |
| 13 | Lower generator. | 215 | 185 in, 215 out. | 2.4 | 53 in, 59 out. | 1,156 out. | −24.8 in, −13.5 out. | 1.0 | 9.85 in, 8.85 out. | 235,000 |
| 18 | Upper condenser. | 223 | | 18.2 | 0 | 1,201 in, 191 out. | | 1.21 | | |
| 17 | Lower generator. | 318 | 278 in, 318 out. | 18.2 | 53 in, 59 out. | 1,201 out. | 23.4 in, 29.5 out. | 1.21 | 11.95 in, 10.74 out. | 274,000 |
| 38 | Lower solution heat exchanger. | | 86–186 to gen., 215–101 from gen. | 2.4 | 53 to gen., 59 from gen. | | −76 to −24.8, −13.5 to −70.5. | | 9.85 to gen., 8.85 from gen. | 93,000 |
| 28 | Upper solution heat exchanger. | | 128–278 to gen., 318–143 from gen. | 18.2 | 53 to gen., 59 from gen. | | −55 to 23.4, 29.5 to −51.5. | | 11.95 to gen., 10.75 from gen. | 172,000 |
| 35 | Condensate sub cooler. | 223 in, 133 out. | | 18.2 | 0 | 191 in, 101 out. | | 1.21 | | 20,000 |

[1] Lbs. solution or refrigerant per lb. refrigerant to lower evaporator.

While the basic cascade cycle is essentially two separate absorption cycles with heat exchange between certain components, this does not necessarily mean that two separate machines are required. To join the two cycles thermally, the use of a corrugated metal heat exchanger is advantageous.

Such an arrangement is illustrated in FIGURE 2 which is a schematic diagram of one form of a cascade cycle machine employing two drums wherein heat exchanging components are joined. The upper drum 43 contains the generators and condensers from both loops, while the evaporators and absorbers from both loops occupy the lower drum 44. It will be apparent that in the upper drum 43 the upper loop condenser 18 lies on the undersurface of the corrugated membrane 41 while the lower generator 13 is on the upper surface thereof. The heat of condensation from the upper-loop condenser then passes directly into the solution in the lower-loop generator. A similar arrangement is shown in the lower drum 44 between the lower-loop absorber 12 and the upper-loop evaporator 15. In this case the lower-loop absorber 12 is shown on the upper surface of the corrugated membrane 42. The heat of absorption from the lower loop is rejected directly to the upper-loop evaporator 15 which occupies the lower surface of the corrugated heat-exchanger 42.

LOW-TEMPERATURE CASCADE CYCLE

A variation of the basic cascade cycle is possible which would make the system even more suitable for the residential market and this variation is illustrated by FIGURES 3 and 3a. This is a low-generator-temperature variation, hereinafter referred to as the low-temperature cascade cycle. It comprises a means of arranging the components so that it is possible to operate at very high sink-temperatures and still maintain resonably low maximum solution temperatures in the generator. For this advantage the cycle gives up a measure of operating efficiency but this is not entirely to its disadvantage since other factors make it more suitable to residential applications.

In this low-temperature cascade system, as indicated in FIGURE 3, there is a reduced number of primary components as compared to the system previously described, six being used instead of eight. These components consist of the lower evaporator 11a, the lower absorber 12a, the condenser 14a, the upper evaporator 15a, the upper absorber 16a, and the generator 17a. FIGURE 3 shows the various components arranged vertically at different levels according to operating temperatures, this system operating at only four levels as compared to the five levels of the previous system, since no components operate at the highest level designated as $T_h$. Table III below specifies the components at the respective temperature levels which are the same as listed in Table I.

TABLE III

| Operating temp. | Lower loop Comp. 11a–14a | Upper loop Comp. 15a–17a |
|---|---|---|
| $T_h$ (highest) | | |
| $T_{hi}$ (higher intermediate). | | 17a-generator. |
| $T_s$ (sink) | 14a-condenser | 16a-upper absorber. |
| $T_{li}$ (lower intermediate). | 12a-lower absorber | 15a-upper evaporator. |
| $T_l$ (lowest) | 11a-lower evaporator | |

In this low-temperature modification of the cascade system, again certain components are in heat-exchange relationship, but in this example, only the low-temperature or lower absorber 12a is in heat-exchange relationship with the high-temperature or upper evaporator 15a. The heat to motivate the entire cascade system, designated as quantity $Q_g$, is supplied directly from a suitable high temperature sources 20a accepted by the single generator 17a which operates at the higher intermediate temperature. This temperature, which is at the level $T_{hi}$, causes boiling off of refrigerant vapor from the liquid refrigerant and absorber solution therein, through the connecting line 21a to the single condenser 14a which rejects heat of condensation to sink, designated as the quantity $Q_c$, and it will be noted that this condenser operates at the temperature level $T_s$. From this condenser 14a part of the liquid refrigerant will pass through a line 31a, equipped with an expansion valve 32a, to the lower evaporator 11a and part of the liquid refrigerant will pass through a line 31b, equipped with an expansion valve 32b, to the upper evaporator 15a. The evaporator 11a operates at the lowest temperature level $T_l$ and receives the cooling load which is designated as the quantity $Q_e$. The pure liquid refrigerant in this evaporator 11a is converted by the cooling load into a refrigerant vapor which passes through a line 33a into the lower absorber 12a which, as previously indicated, is in heat exchange relationship with the upper evaporator 15a. Part of the liquid refrigerant leaves the condenser 14a through the line 31b and enters the upper evaporator 15a. The absorbing solution in the absorber 12a takes the vapor from the lower evaporator 11a into solution and rejects heat of asborption, indicated as the quantity $Q_{ae}$ to the upper evaporator 15a. This lower absorber 12a and the associated upper evaporator 15a, operate at the lower intermediate temperature level $T_{li}$. From this absorber, the absorbing solution is withdrawn by a connected suitable pump 35a and is pumped through a line 36a into the generator 17a. The heat of absorption from the lower absorber 12a converts the pure liquid refrigerant in the upper evaporator 15a into vapor and this vapor passes through a line 24a into the upper absorber 16a which also operates at temperature level $T_s$ in rejecting heat to sink, which is designated as the quantity $Q_a$. The generator 17a is connected by a liquid line 27a with the upper absorber 16a. A heat exchanger 28a is provided between the lines 27a and 36a. The upper asborber 16a is also connected by a liquid line 26a with the lower absorber 12a and a heat exchanger 38a is provided between the lines 36a and 26a.

It will be noted from the P-T-$x$ plot in FIGURE 3a and from reference to FIGURE 3, that the lower absorber 12 still rejects heat to the upper evaporator 15a as in the basic cascade system previously described. However, in this low temperature system, there is only one generator and one condenser. This arrangement is similar to taking the basic cascade system of FIGURE 1 with its two separate cycle loops, and pumping the upper solution to the lower generator instead of to the upper generator as in the normal operation thereof so that the lower generator would receive solution from both the upper and lower cycles. Upon application of the motivating heat to the only generator 17a, which is now accepted at a reduced higher temperature, as compared to the basic cascade cycle, at the level $T_{h1}$, the refrigerant is desorbed to condense in the only condenser 14a at sink conditions. Refrigerant condensate is then divided and directed to both the lower and upper evaporators 11a and 15a. Concentrated solution from the generator 17a can first pass to the upper absorber 16a and from there to the lower absorber 12a before being returned to the generator 17a.

The one prime advantage of this low-temperature cascade system over the basic cascade system previously described is the lower maximum solution temperatures possible for the same lower evaporator and sink-temperature conditions. The low-temperature cascade system accepts its motivating heat at the lower temperature generator which operates at a temperature level lower than that which prevails in the upper generator of the basic cascade system. Lower maximum solution temperatures mean reduced corrosion problems, a longer trouble-free life, and the possibility of employing less costly materials of construction. An examination of this low-temperature cycle with a 50° F. temperature in the lower evaporator 11a and a minimum solution temperature in the upper absorber 16a of 170° F., still kept the maximum solution temperature in the generator 17a well below 300°, in this case 270° F. The saturation temperature in the condenser 14a was also 170° F. This is an extremely severe assumption for internal heat rejection temperatures, but it does illustrate the low maximum solution temperatures possible with this low-temperature cascade cycle. It is estimated that the COP of a direct-fired low-temperature cascade system of this nature would be in the range of about 0.25 to 0.3+, based on the heating value of the fuel. Since it is possible to arrange a unit employing this low-temperature cascade cycle not only to cool but also to heat, the heating-to-cooling ratio would be in the range of 3 or 4 to 1.

The low-temperature cascade cycle of this invention appears to be an ideal cycle to employ in a residential unit that would both heat and cool the home. Since the non-toxic lithium-bromide and water solution would preferably be the working fluid pair, the primary unit could be installed inside the home. This means that the unit would not have to be of weatherized construction. Also, by having the ability to both heat and cool, the cost of a heating furnace can be absorbed into the initial cost of this unit.

As pictured, this low-temperature cascade unit would be installed in the basement close to existing gas and electric service lines and the flue. It would have a direct expansion evaporator that would be ducted directly to a hot-air distribution system. If a blower is already in place it may not have to be supplied with this unit. Outside the house there would be a simple air-cooled heat exchanger for heat rejection when operating as a cooler. This would be connected to the primary unit by a pumped recirculating liquid loop, or perhaps even a one-pipe thermally motivated loop using a refrigerant that would evaporate in the primary unit and condense in the outside heat exchanger with condensate return in the same pipe.

Again, the advantages of this low-temperature cascade unit would be as follows: First cost might be quite acceptable since the unit can adequately both heat and cool a home and thereby absorb the cost of the heating furnace. Installation could prove cheaper than other systems since gas and electric service are usually available right in the basement area. The only extended connections required are to the remote air-cooled heat exchanger and these consist of simple heat transport lines and 110 volt A.C. power to the fan motor. Maintenance costs should be low since the unit can be air-cooled and the need for a cooling tower has been eliminated. Also, the relatively low generator temperatures will keep corrosion down thereby minimizing service calls to purge non-condensibles from the system. Operating costs in the cooling mode should be acceptable since they should be about the same as present ammonia-water units running with trap-type solution-transfer systems.

CONCLUSION

It will be apparent that in both forms of the systems disclosed which use the thermodynamic cascade cycle according to this invention, the low-temperature absorber and the high temperature evaporator are in heat-exchange relationship so that the high-temperature evaporator cools the low-temperature absorber. Also, in each system the two components that reject heat to the available heat sink are the high-temperature absorber and the condenser which operates at the same temperature level as the absorber. In each system, the cooling load is accepted at the low-temperature evaporator which operates at the lowest temperature level of the system. The heat-exchange relationship in both forms of the cascade systems of this invention makes it possible to use the more desirable lithium-bromide and water solution working fluid pair since lower maximum solution temperatures and concentrations are possible under evaporator and sink temperature conditions which make air-cooling possible. These lower solution temperatures and concentrations means reduced crystallization and corrosion problems, a longer, trouble-free life, and the possibility of employing less costly materials of construction. Also, these systems are capable of use for heating as well as cooling.

Having thus described this invention, what is claimed is:

1. An absorption refrigeration system using a cascade thermodynamic cycle comprising generator means, condenser means, evaporator means, and absorber means operatively connected together;

said evaporator means comprising a low-temperature evaporator and a high-temperature evaporator, said absorber means including a low-temperature absorber and a high-temperature absorber, said low-temperature absorber and said high-temperature evaporator being in cooperating heat exchange relationship.

2. A system according to claim 1 in which:

heat sink means cooperates with the condenser means and the high-temperature absorber which operate at substantially the same temperature level, said cooperating low-temperature absorber and high-temperature evaporator operates at a temperature level lower than that of the condenser means, and said low-temperature evaporator operates at a temperature level lower than that of said cooperating low-temperature absorber and high-temperature evaporator.

3. An absorbent refrigeration system according to claim 2 which contains a refrigerant-absorbent solution in the form of water and lithium-bromide.

4. An absorbent refrigeration system according to claim 3 in which the heat sink means is ambient air.

5. An absorption refrigeration system according to claim 1 in which said means is arranged in two separate upper and lower loops, each of which contains a suitable refrigerant-absorbent solution; the upper loop comprising:
 an upper generator motivated by an external high-temperature heat source which causes boiling off of the refrigerant vapor from the solution therein;
 an upper condenser operating at a temperature level lower than that of the generator for receiving the refrigerant vapor and condensing it;
 an upper evaporator operating at a temperature level lower than that of the upper condenser for receiving the condensed refrigerant liquid from the upper condenser;
 and an upper absorber operating at a temperature level higher than that of the upper evaporator and lower than that of the upper condenser for receiving vapor from the upper evaporator and rejecting heat of absorption to cooperating sink means, the upper absorber receiving absorbing solution from the upper generator and supplying refrigerant-absorbent solution thereto;
the lower loop comprising:
 a lower generator in heat exchange relationship with the upper condenser so that the heat rejected by the upper condenser will boil off the refrigerant vapor from the solution therein;
 a lower condenser for receiving refrigerant vapor from the lower generator and condensing it and rejecting heat of condensation to cooperating sink means;
 a lower evaporator operating at a temperature level lower than that of the lower condenser and the upper evaporator for receiving the condensed refrigerant liquid from the lower condenser and having cooperating means for subjecting it to the cooling load;
 and a lower absorber in heat exchange relationship with the upper evaporator for receiving the vapor from the lower evaporator and rejecting heat of absorption to the upper evaporator, the lower absorber receiving absorbing solution from the lower generator and supplying refrigerant and absorbent solution thereto.

6. A system according to claim 5 in which the generators and condensers from both loops are contained in one drum and the evaporators and absorbers from both loops are contained in a second drum, the upper drum having a heat exchange membrane between the lower generator and the upper condenser, and the second drum having a heat exchange membrane between the lower absorber and the upper evaporator.

7. A system according to claim 6 in which the membrane is of corrugated form.

8. An absorption refrigeration system according to claim 1 in which said means are connected in a loop containing suitable refrigerant-absorbent solution and the loop includes:
 an upper generator motivated by an external heat source which causes boiling off of the refrigerant vapor from the solution therein;
 a condenser operating at a temperature level lower than that of the generator for receiving the refrigerant vapor and condensing it and rejecting heat of condensation to cooperating sink means;
 a lower evaporator operating at a temperature level lower than that of the condenser for receiving condensed refrigerant liquid from the condenser and having cooperating means for subjecting it to the cooling load;
 a lower absorber operating at a temperature level intermediate that of the lower evaporator and the condenser for receiving the vapor from the lower evaporator; the lower absorber supplying solution to the generator;
 an upper evaporator in heat exrhange relationship with the lower absorber for also receiving condensed refrigerant liquid from the condenser and receiving heat of absorption from the lower absorber to convert the liquid refrigerant into vapor;
 an upper absorber operating substantially at the same temperature level as said condenser for receiving the refrigerant vapor from the upper evaporator and rejecting heat of absorption to cooperating sink means, the upper absorber also receiving solution from the generator and supplying solution to the lower absorber.

9. The method of producing refrigeration which comprises:
 heating a refrigerant-absorbent solution to drive off refrigerant in the form of a vapor;
 condensing the vapor refrigerant;
 passing condensed refrigerant to a low-temperature evaporator;
 passing vapor from the low-temperature evaporator to a low-temperature absorber;
 passing condensed refrigerant to a high-temperature evaporator;
 using the heat of absorption of the low-temperature absorber to convert the liquid refrigerant in the high-temperature evaporator into a vapor;
 and passing the refrigerant vapor from the high-temperature evaporator into a high-temperature absorber.

10. The method of claim 9 including:
 rejecting the heat of condensation and the heat of absorption of the high-temperature absorber to a suitable heat sink;
 and applying a cooling load at the low-temperature evaporator.

11. The method of claim 10 in which the refrigerant-absorbent solution is water and lithium-bromide.

12. The method of claim 11 in which the heat is rejected to ambient air as the heat sink.

13. The method of claim 9 including:
 heating the refrigerant-absorbent solution in separate high-temperature and low-temperature generators to drive off from each refrigerant in the form of a vapor;
 condensing the vapor refrigerant from the high-temperature generator in a high-temperature condenser;
 passing the condensed refrigerant to a high-temperature evaporator;
 passing the vapor from the high-temperature evaporator into a high-temperature absorber and rejecting heat of absorption to a suitable sink means;
 returning the absorbed refrigerant to a high-temperature generator;
 condensing the vapor refrigerant from the low- temperature generator and rejecting heat of condensation to a suitable sink means;
 passing the condensed refrigerant to a low-temperature evaporator having the cooling load applied thereto;
 passing the refrigerant vapor from the low-temperature evaporator to a low-temperature absorber and rejecting heat of absorption to the high-temperature evaporator to vaporize the refrigerant therein;
 and returning the absorbed refrigerant to the low-temperature generator.

14. The method of claim 9 including:
 heating the refrigerant absorbent solution in a single generator to drive off refrigerant in the form of a vapor;
 condensing the vapor refrigerant in a single condenser which rejects heat of condensation to a suitable sink means;
 passing part of the condensed refrigerant to a low-temperature evaporator which receives the cooling load and another part to a high-temperature evaporator;

passing refrigerant vapor from the low-temperature evaporator to a low-temperature absorber and rejecting heat of absorption to the high-temperature evaporator;

returning the absorbed refrigerant from the low-temperature absorber to the generator;

passing refrigerant vapor from the high-temperature evaporator to a high-temperature absorber and rejecting heat of absorption to suitable sink means;

and returning the absorbed refrigerant from the high-temperature absorber through the low-temperature absorber to the generator.

References Cited
UNITED STATES PATENTS

| | | | |
|---|---|---|---|
| 2,350,115 | 5/1944 | Katzow | 62—335 X |
| 2,640,331 | 6/1953 | Backstrom | 62—492 X |
| 3,126,720 | 3/1964 | Stubblefield | 62—476 X |

LLOYD L. KING, Primary Examiner

U.S. Cl. X.R.

62—101, 335, 476.